Jan. 2, 1945.     T. DANIEL     2,366,600
AUTOMOBILE COVER
Filed May 18, 1944

INVENTOR.
Thomas Daniel
BY
Louis Chayka
Attorney

Patented Jan. 2, 1945

2,366,600

UNITED STATES PATENT OFFICE 2,366,600

AUTOMOBILE COVER

Thomas Daniel, Detroit, Mich.

Application May 18, 1944, Serial No. 536,163

2 Claims. (Cl. 135—5)

My improvement pertains to covers made of flexible material such as cloth, rubber, plastic etc., and is designed for protection of automobiles, trucks and other vehicles, against rain, snow, dust, and the rays of light, particularly sun light.

The purpose of my invention is to provide a cover simple in form, easy to manufacture and light in weight. A further object of my improvement is to provide a cover which occupies little space as it may be easily folded up, and which may be quickly and easily put up for use, or removed, as the case may be. Another object of my improvement is to provide a cover which will protect a vehicle without coming in contact with the outer surface of its body.

I have accomplished all the above purposes in a manner which I shall describe with reference to the accompanying drawing in which.

Similar numerals refer to similar parts throughout the several views.

Figure 1:
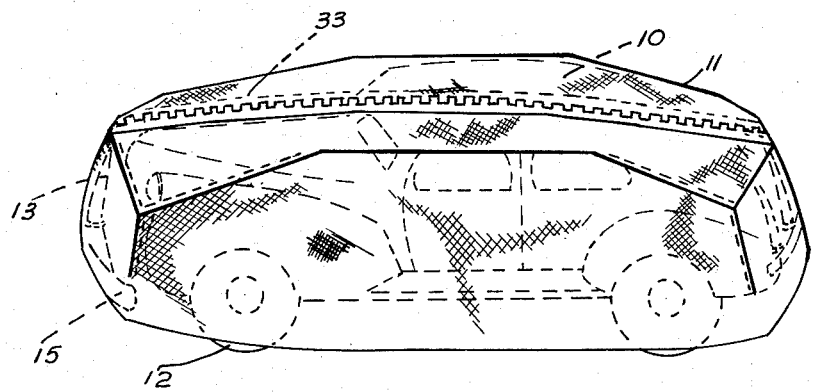
Fig. 1 is a perspective view of my cover as placed over the body of a vehicle.

The manner in which my cover, generally indicated by numeral 11, is placed over the body of an automobile 10, is shown in Fig. 1. By employing posts 13, on top of bumpers 15, to support my cover, it is possible to stretch said cover over the body of the vehicle so that said cover does not come in contact therewith.

Figure 4:
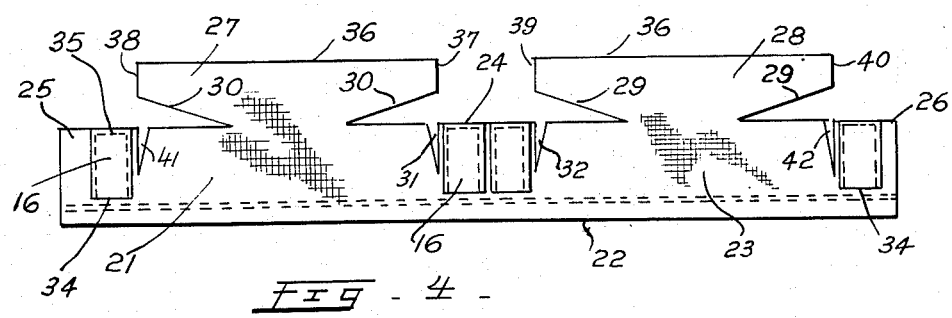
Fig. 4 is a plan view of a strip of flexible material properly cut, to be made into my cover.

The cover is made of one single piece of suitable material such as a woven fabric, which may be rubberized or otherwise waterproofed. Such a strip is shown in Fig. 4. It is long enough to form what is to be side panels 21 and 23, a portion 24 to fit over the back of the vehicle, and two front flaps 25 and 26. The two flaps are to be brought together into a marginal abutment and retained so by suitable means which will be mentioned herein. The lower edge 22 of the strip runs along a straight line and is turned over and made into a hem. The parts of the strip which are to be made into the top section of the cover and which are intended to stretch over the top of the vehicle, are marked 27 and 28 respectively. Each has a straight upper edge 36, the two edges being design d to removably abut each other when the cover is made up. Said parts 27 and 28, have angular undercuts 30 and 29, respectively, so that the edges of said cuts may be joined to the upper edges of side panels 21 and 23, respectively. One end 38 of part 27 is joined to top of flap 25, the other end to the upper edge of portion 24. Similarly, ends 39 and 40 of part 28 are joined to members 24 and 26. Angular cuts into the body of the strip, shown by numerals 31, 32, 41 and 42, respectively, serve to impart to the cover, when made up, a slightly bell-like appearance, narrower at the top and fuller at the bottom.

The upper edges 36 of the strip shown in Fig. 4, are provided with opposite, co-operating parts of a zipper 33. On what is to be the inner side of the cover are four inverted pockets 16, open at the lower side 34 and closed at top 35.

Figure 5:
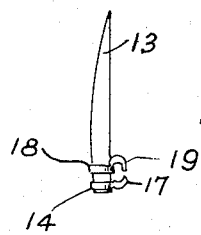
Fig. 5 is a side elevation of a post serving as a supporting means for my cover.

Four posts 13, are mounted on the bumpers of the vehicle, two of said posts being at one end of the vehicle and two at the other. The posts are removably affixed to the bumpers by means of suitable clips. The clip shown in Fig. 5, includes a stationary band with a jaw 17, and a movable band 18, with an oppositely set jaw 19, the movable band being normally held in place by means of a spring which is not shown. The jaws facing each other, clamp the body of the bumper from opposite sides. When mounted on the bumpers, said posts 13 are spaced from each other so as to fit into respective pockets 16. The posts are sufficiently high so that the top of the cover supported by them, does not come in contact with the top of the vehicle protected by said cover.

Figure 2:
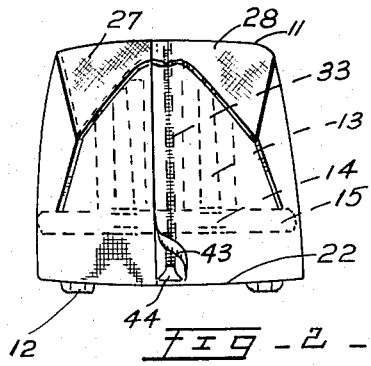
Fig. 2 is a front elevation of my cover as placed over a vehicle.
Figure 3:
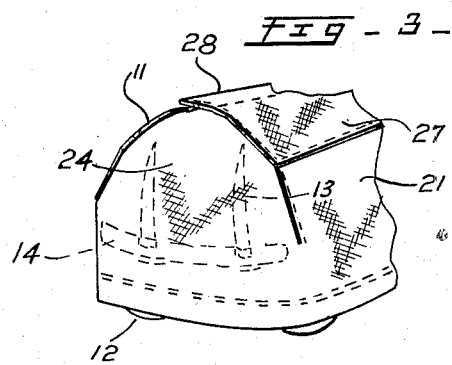
Fig. 3 is a fragmentary perspective view of my cover showing its rear side when placed over a vehicle.

The edges of strip shown in Fig. 4 may be joined as above stated, in any suitable manner, such as sewing, which is the most practical method. It will be seen, however, that very little sewing will be needed to convert a strip shown in Fig. 4 into a serviceable cover. When the respective edges have been joined, and pockets 16 are in place, only the addition of a zipper or such means as eyes and hooks, along edges 36 and along the edges of flaps 25 and 26, will be needed to make the cover complete. The zipper will extend in one continuous line from the point where top members 27 and 28 are joined to member 24, along the top of the cover to the front flaps 25 and 26, and down to the bottom edge 22 of the cover as shown in Fig. 2. The zipper may be spaced from the edge of the respective parts to which it is affixed, so that the marginal portion of each part forms a covering band for said zipper. Such a band is shown by numeral 43. Numeral 44 shows a joining glider for the zipper.

It will be seen that some changes may be made in the construction of my cover, without departing from the inventive principle disclosed herein. What I, therefore, wish to claim, is as follows:

1. In combination a cover for a vehicle equipped with bumpers, said cover being made of a single strip of fabric, comprising a substantially rectangular lower part to form two side panels, a rear portion and two marginally abutting front flaps, and two upper parts integrally connected to said panels, the upper edges of said parts and the abutting edges of the flaps having means for removably fastening them to each other, inverted pockets on the inner side of the cover, extending vertically with respect to the vehicle, and removable posts on the bumpers of the vehicle to fit into said pockets and to support the cover above said vehicle.

2. In combination a cover for a vehicle equipped with bumpers, said cover being made of one strip of fabric and comprising a rear portion, two side panels, integrally connected thereto, a front flap integrally connected to each panel, the two flaps being in a marginal abutment, and a top made of two marginally abutting parts, each integrally connected to its respective side panel, said marginally abutting parts and flaps being provided with means to releasably fasten them together, the cover having on its inner side a number of vertical inverted pockets, and upright posts on said bumpers fitting into said pockets to support said cover.

THOMAS DANIEL.